US010417022B2

(12) United States Patent
Harpur et al.

(10) Patent No.: US 10,417,022 B2
(45) Date of Patent: Sep. 17, 2019

(54) ONLINE VIDEO PLAYBACK ANALYSIS AND ASSISTANCE

(71) Applicant: International Business Machines Corporation, Armonk, NY (US)

(72) Inventors: Liam S. Harpur, Dublin (IE); Erik H. Katzen, Argyle, TX (US); Sumit Patel, Irving, TX (US); Pascal Wagner, Saulheim (DE)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 15/184,383

(22) Filed: Jun. 16, 2016

(65) Prior Publication Data

US 2017/0364372 A1    Dec. 21, 2017

(51) Int. Cl.
| | | |
|---|---|---|
| *G06F 9/451* | (2018.01) | |
| *G06F 3/0481* | (2013.01) | |
| *H04N 21/431* | (2011.01) | |
| *H04N 21/4788* | (2011.01) | |
| *H04N 21/61* | (2011.01) | |

(Continued)

(52) U.S. Cl.
CPC ............ *G06F 9/453* (2018.02); *G06F 3/0481* (2013.01); *G06F 16/738* (2019.01); *G06F 16/9535* (2019.01); *H04L 65/4015* (2013.01); *H04L 65/4069* (2013.01); *H04N 21/252* (2013.01); *H04N 21/4312* (2013.01); *H04N 21/44008* (2013.01); *H04N 21/44204* (2013.01); *H04N 21/44222* (2013.01); *H04N 21/4667* (2013.01); *H04N 21/4758* (2013.01); *H04N 21/4788* (2013.01); *H04N 21/4882* (2013.01);

(Continued)

(58) Field of Classification Search
CPC ........... H04N 21/252; H04N 21/44204; H04N 21/4667; H04N 21/4788; H04N 21/658; H04N 21/4884; H04N 21/4758; H04N 21/44008; H04N 21/44222; H04N 21/4882; H04N 21/6125; H04N 21/4312; G06F 9/453; G06F 17/30837; G06F 16/9535; G06F 16/738; G06F 3/0481; H04L 65/4015; H04L 65/4069
See application file for complete search history.

(56) References Cited

U.S. PATENT DOCUMENTS

| | | |
|---|---|---|
| 8,848,109 B2 | 9/2014 | Pornprasitsakul et al. |
| 2004/0189868 A1 | 9/2004 | Molaro et al. |

(Continued)

OTHER PUBLICATIONS

Anand et al., "A Method of Crowd-Sourced Information Extraction From Large Data Files", © Springer International Publishing Switzerland 2014, MLDM 2014, LNAI 8556, pp. 431-436, 2014.

(Continued)

*Primary Examiner* — Kunal Langhnoja
(74) *Attorney, Agent, or Firm* — Christopher K. McLane

(57) ABSTRACT

In an approach for providing assistance to a user viewing an online video, the computer receives an online video. The computer determines that an uncommon action occurs with the online video. The computer receives an issue based on the uncommon action. The computer receives one or more responses associated with the received issue. The computer identifies an at least one response from the received one or more responses associated with the received issue. The computer provides the identified at least one response.

19 Claims, 5 Drawing Sheets

(51) Int. Cl.

| | | |
|---|---|---|
| *H04N 21/442* | (2011.01) | |
| *H04N 21/488* | (2011.01) | |
| *H04N 21/25* | (2011.01) | |
| *H04N 21/466* | (2011.01) | |
| *H04L 29/06* | (2006.01) | |
| *G06F 16/738* | (2019.01) | |
| *G06F 16/9535* | (2019.01) | |
| *H04N 21/44* | (2011.01) | |
| *H04N 21/475* | (2011.01) | |
| *H04N 21/658* | (2011.01) | |

(52) U.S. Cl.
CPC ..... *H04N 21/4884* (2013.01); *H04N 21/6125* (2013.01); *H04N 21/658* (2013.01)

(56) References Cited

U.S. PATENT DOCUMENTS

| | | |
|---|---|---|
| 2009/0273711 A1 | 11/2009 | Chapdelaine et al. |
| 2011/0173214 A1 | 7/2011 | Karim |
| 2011/0289530 A1* | 11/2011 | Dureau .............. H04N 21/4622 725/38 |
| 2011/0307391 A1 | 12/2011 | Mercuri et al. |
| 2011/0313933 A1 | 12/2011 | Dai et al. |
| 2013/0185138 A1 | 7/2013 | Roy et al. |
| 2014/0143218 A1 | 5/2014 | Sanghavi et al. |
| 2014/0310746 A1 | 10/2014 | Larsen et al. |
| 2015/0074698 A1* | 3/2015 | Pinto .................. H04N 21/4756 725/14 |
| 2015/0254596 A1 | 9/2015 | Nayar et al. |
| 2017/0177718 A1* | 6/2017 | Loganathan ...... G06F 17/30828 |

OTHER PUBLICATIONS

Linux Defenders et al., "Ability to watch media "edited" or "personalized" or "enhanced" for arbitrary (online and offline) movie players", An IP.com Prior Art Database Technical Disclosure, Original Publication Date: Nov. 7, 2012, IP.com No. IPCOM000223192D, IP.com Electronic Publication Date: Nov. 7, 2012, 13 pages.

Popp, Jens et al, "Perfect Playlist", An IP.com Prior Art Database Technical Disclosure, IP.com No. IPCOM000216755D, IP.com Electronic Publication Date: Apr. 17, 2012, Copyright: Dolby Laboratories, 10 pages.

"A method to improve the user experience of presentation video", An IP.com Prior Art Database Technical Disclosure, Authors et. al.: Disclosed Anonymously, IP.com No. IPCOM000239566D, IP.com Electronic Publication Date: Nov. 17, 2014, 9 pages.

* cited by examiner

ONLINE VIDEO PLAYBACK ANALYSIS AND ASSISTANCE

BACKGROUND

The present invention relates generally to the field of crowdsourcing, and more particularly to analyzing the playback of an online video and augmenting the online video with crowd sourced information.

Crowdsourcing occurs when a business or individual (e.g., crowdsourcer) advertises a problem and/or project via a related website or Internet, and invites geographically dispersed subject matter experts and/or the general public (e.g., crowd, unofficial group of individuals, etc.) to propose a solution and/or participate in finishing the project. Crowdsourcing solicits contributions from a large group of individuals, such as an online community, to provide needed services, ideas, and/or content that answer the advertised problem and/or project. The online communities are virtual communities (e.g., social network of individuals) which allow the members to interact and collaborate with other members primarily over the Internet. The online communities act as an information system, which studies complementary networks utilized by the individuals and/or organizations to collect, filter, process, create, and distribute data and/or information.

Streaming media is multimedia that travels as a stream of data from a server via a service provider (e.g., internet service provider, cable company, satellite, managed service providers, etc.) to an end-user. The end-user receives the streaming media and is able to view the streaming media throughout delivery and/or after delivery (e.g., play, replay, etc.) via a decoder or a plugin. The decoder is a stand-alone player or a plugin that works as part of a Web browser. Unless watching a live broadcast, streaming media allows for pausing, back-up (i.e., rewind), move forward (i.e., fast forward) in addition to playing, similar to that of watching a digital video recording.

SUMMARY

Aspects of the present invention disclose a method, computer program product, and system for providing assistance to a user viewing an online video, the method comprising one or more computer processors receiving an online video. The method further includes one or more computer processors determining that an uncommon action occurs with the online video. The method further includes one or more computer processors receiving an issue based on the uncommon action. The method further includes one or more computer processors receiving one or more responses associated with the received issue. The method further includes one or more computer processors identifying an at least one response from the received one or more responses associated with the received issue. The method further includes one or more computer processors providing the identified at least one response.

DETAILED DESCRIPTION

Online videos include amateur or professional video content that are created for informational, educational, instructional, entertainment, advertising purposes, etc. Online videos are viewable by a user though a video portal (i.e., video access occurs through a website via the Internet). Additionally, the video portal includes basic features for localizing content and user-experience. For example, an online video as originally created includes inline video captions that are in English. However, if the user viewing the online video utilizes a video portal in which the language is set to Spanish by the user then video portal auto-translates the English captions into the identified language of Spanish. Embodiments of the present invention recognize that while any user is able to create and publish online video content, only a subset of the entire users to which the online video is available, are able to access resources to consume the online video. Embodiments of the present invention also recognize that different skill levels, cultural diversity (e.g., dialect, local expressions, slang, etc.), knowledge of a language, etc. are issues (e.g., obstacles) that hinder the ability of the user (e.g., viewer) to correctly consume the content of the online video in the manner intended by the creator. In addition, embodiments of the present invention recognize the creator also encounters obstacles capturing and/or anticipating the issues encountered by the viewer, and implement corrective measures (e.g., captions, cue points, pop-ups, etc.) to overcome the issues. Embodiments of the present invention analyze the issues encountered by the viewer and provide crowd sourced responses to the viewer in real-time and/or modify the online video for future viewers to overcome the issues.

Figure 1:
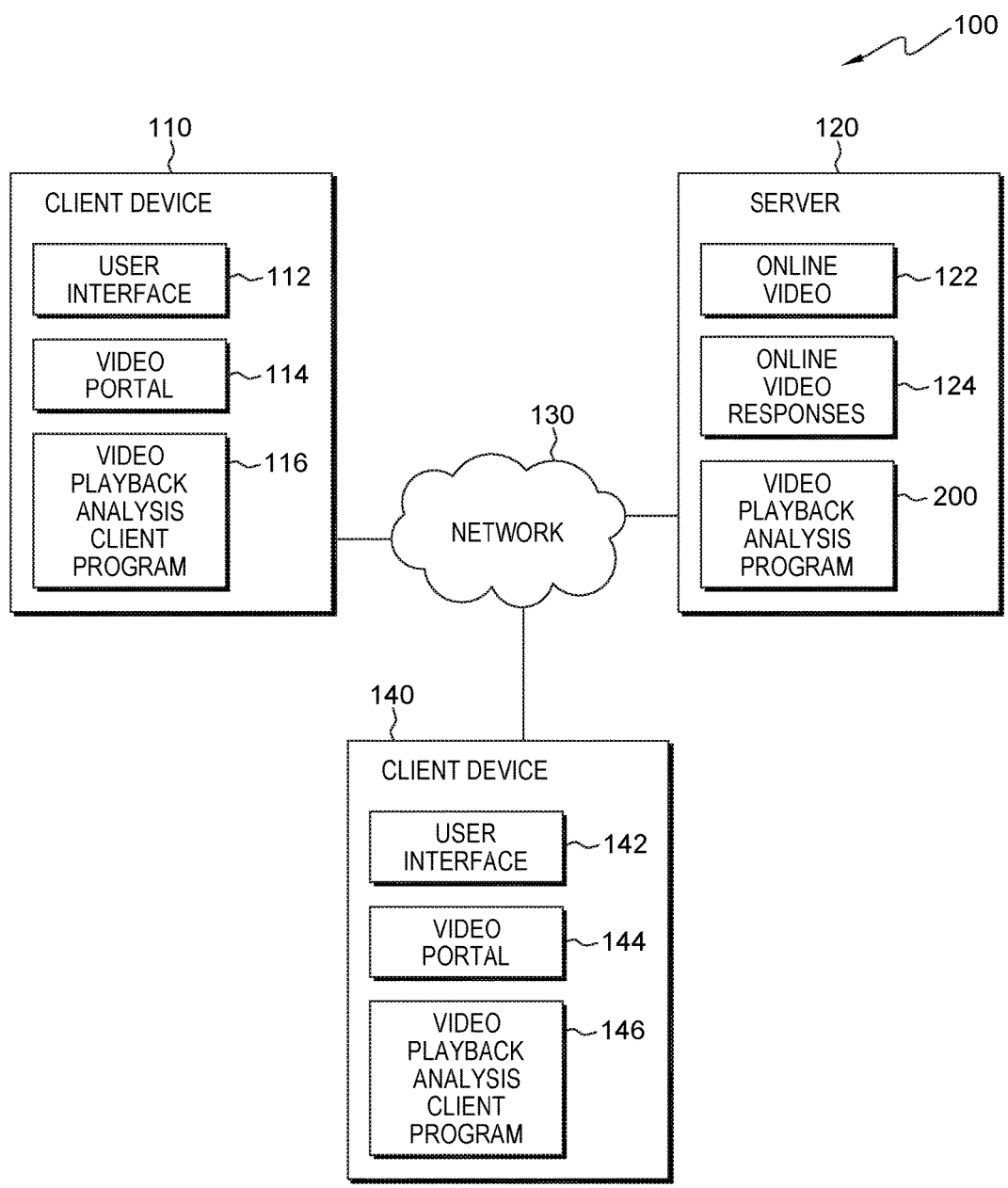
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes client device 110, client device 140, and server 120 interconnected over network 130. Distributed data processing environment 100 may include additional client devices, computing devices, mobile computing devices, servers, computers, storage devices, or other devices not shown.

Client device 110 and client device 140 may be a web server or any other electronic device or computing system capable of processing program instructions and receiving and sending data. In some embodiments, client device 110 and/or client device 140 may be a laptop computer, a tablet computer, a netbook computer, a personal computer (PC), a desktop computer, a personal digital assistant (PDA), a smart phone, or any programmable electronic device capable of communicating over network 130. In other embodiments, client device 110 and/or client device 140 may represent a server computing system utilizing multiple computers as a server system, such as in a cloud computing environment. In general, client device 110 and client device 140 are representative of any electronic device or combination of electronic devices capable of executing machine readable program instructions as described in greater detail with regard to FIG. 4, in accordance with embodiments of the present invention. In the depicted embodiment, client device 110 contains user interface 112 video portal 114, and video playback analysis client program 116. In the depicted embodiment, client device 140 contains user interface 142 video portal 144, and video playback analysis client program 146.

User interfaces 112 and 142 are programs that provide an interface between a user and client device 110 and a user and client device 140 respectively, and a plurality of applications that reside on client devices 110 and 140 (e.g., video portal 114, video playback analysis client program 116, video portal 144, video playback analysis client program 146). Additionally, user interface 112 (e.g., user interface 142) provides an interface between a user of client device 110 (e.g., client device 140) and a plurality of applications that reside and/or may be accessed over network 130 (e.g., connected to server 120, a client device, or a computing device not shown). A user interface, such as user interface 112 and user interface 142, refers to the information (e.g., graphic, text, sound) that a program presents to a user and the control sequences the user employs to control the program. A variety of types of user interfaces exist. In one embodiment, user interface 112 and user interface 142 are graphical user interfaces. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 and user interface 142, send and receive information through video playback analysis client program 116 and video playback analysis client program 146 to video playback analysis program 200.

Video portal 114 and video portal 144 are websites that offer user created or professionally created video content. Video portal 114 and video portal 144 utilize multi-media players (e.g., flash players, media players, web players, etc.) to allow viewers to watch and or navigate through online video 122. In the depicted embodiment, video portal 114 and video portal 144 are standalone multi-media players or a flash application on client device 110 and client device 140 respectively that access online video 122. In another embodiment, video portal 114 and video portal 144 are browser plugins (i.e., software that enhances another software application and usually can be run independently) or browser extensions (i.e., software that modifies the interface and/or behavior of web browsers) that access online video 122. In some other embodiment, video portal 114 and video portal 144 include video playback analysis client program 116 and video playback analysis client program 146 respectively. Video portal 114 and video portal 144 include interface controls to play, fast forward, repeat, playback speed (e.g., speed up, slow down, ×2, ×4, ×8, etc.), frame selection, pause, rewind, freeze frame, etc., which modify the manner in which the viewer views online video 122. Video portal 114 and video portal 144 send the viewer selections, of the interface controls that occur during the playback of online video 122, to video playback analysis program 200 via video playback analysis client program 116 and video playback analysis client program 116. In the depicted embodiment, video portal 114 resides on client device 110 and video portal 144 resides on client device 140. In another embodiment, video portal 114 and video portal 144 reside on server 120. In some other embodiment, video portal 114 and video portal 144 reside on another server or device (not shown) provided video portal 114 and video portal 144 are accessible to video playback analysis program 200.

Video playback analysis client program 116 and video playback analysis client program 146 are a set of one of more programs designed to carry out operations that monitor and send viewer actions and/or viewer submissions (e.g., requests for information, questions, answers, responses, etc.) associated with viewing online video 122 via a video portal (e.g., video portal 114, video portal 144) to video playback analysis program 200 for analysis (e.g., identification of issues). Additionally, video playback analysis client program 116 and video playback analysis client program 146 receive information from video playback analysis program 200 that solicits crowd sourced responses to identified issues (e.g., output of an analysis of viewer actions and/or viewer submissions) during viewer playback of online video 122, and provides the solicited crowd soured responses to the viewer (e.g., responds to the analysis and viewer submissions). In the depicted embodiment, video playback analysis client program 116 resides on client device 110 and video playback analysis client program 116 resides on client device 140. In another embodiment, video playback analysis client program 116 and video playback analysis client program 146 are included within video portal 114 and video portal 144 respectively. In another embodiment, video playback analysis client program 116 and video playback analysis client program 146 may reside on server 120 or on another device (not shown) connected over network 130.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 and client device 140 over network 130. In other embodiments, server 120 may represent a server computing system utilizing multiple computers as a server system, such as in a cloud computing environment. Server 120 is representative of any electronic device or combination of electronic devices capable of executing machine readable program instructions as described in greater detail with regard to FIG. 4, in accordance with embodiments of the present invention. Server 120 contains online video 122, online video responses 124, and video playback analysis program 200, as depicted and described in further detail with respect to FIG. 4.

Online video 122 is an amateur (e.g., user) or professionally created video content, for informational, educational, instructional, entertainment, and/or advertising purposes, that is available through websites (e.g., video portal 114, video portal 144), as streaming media. Streaming media (e.g., multimedia), such as online video 122, travels as a stream of data from a server via a service provider (e.g., internet service provider, cable company, satellite, managed service providers, etc.) to an end-user (e.g., viewer). The end-user receives and views the streaming data throughout delivery and/or after delivery (e.g., play, replay, etc.) via video portal 114 and/or video portal 144. In one embodiment, online video 122 includes separate comments (e.g., online video responses 124) that a viewer is able to read and/or view regarding online video 122. For example, a prior viewer leaves a written review, comments, hints, suggestions, etc., that pertain to the content of online video 122. In another embodiment, video playback analysis program 200 updates online video 122 to include an instance of online video responses 124 to provide clarification and/or relevant information to assist a viewer to understand the content of online video 122. Online video 122 is viewed through video portal 114 or video portal 144. In the depicted embodiment, online video 122 resides on server 120. In another embodiment, online video 122 resides on another server or computing device (not shown) connected over network 130 provided online video 122 is accessible by video playback analysis program 200.

Online video responses 124 include comments, suggestions, reviews, etc., that video playback analysis program 200 solicits from users that have viewed online video 122 that are stored for immediate and/or future use (e.g., database, data repository, etc.). Online video responses 124 includes user initiated responses (i.e., general information that the user provides with respect to online video 122 that may provide useful information to future viewers) and/or video playback analysis program 200 solicited responses (i.e., responses to a targeted question provided through crowdsourcing based on a submitted question from the viewer while watching online video 122). For example, a viewer, after watching online video 122 regarding a cooking recipe, leaves a review (e.g., feedback) indicating the quality of the recipe (e.g., ratings for: taste, ease of replicating the recipe, time to taken to prepare, etc.), emergency substitutions, and improvements to the recipe as online video responses 124. In another example, an individual, while viewing online video 122, replays online video 122 multiple times with periodic pauses, and enters a question asking for the measurements and ingredients to recreate the recipe. Video playback analysis program 200 solicits online video responses 124 with respect to the received question (i.e., targeted specific question from a viewer) through crowd sourcing. Video playback analysis program 200 provides an instance or instances of online video responses 124 (includes user initiated and/or video playback analysis program 200 solicited responses) that answer the received question from the viewer. In the depicted embodiment, online video responses 124 resides on server 120. In another embodiment, online video responses 124 may reside on another server or computing device (not shown) connected over network 130 provided online video responses 124 is accessible by video playback analysis program 200.

Network 130 may be a local area network (LAN), a wide area network (WAN) such as the Internet, a wireless local area network (WLAN), any combination thereof, or any combination of connections and protocols that will support communications between client device 110, client device 140, server 120, and other computing devices and servers (not shown), in accordance with embodiments of the present invention. In the depicted embodiment, network 130 is the interconnecting fabric between client device 110, client device 140, and server 120. In some other embodiment, network 130 is the interconnecting fabric between client device 110, client device 140, server 120, and other various components and computing devices (not shown). Network 130 may include wired, wireless, and/or fiber optic connections.

Video playback analysis program 200 is a program, or a set of programs for analyzing user actions associated with the playback of online video 122 to identify an issue, receive a targeted issue (e.g., question, query) from the user (e.g., viewer), solicit crowd sourced assistance, and provide crowd sourced assistance to the user. In addition, in some embodiments, video playback analysis program 200 updates online video 122 to include an instance of online video responses 124 for recurring issues. Video playback analysis program 200 receives information pertaining to the actions taken by a user of client device 110 (e.g., client device 140) while viewing online video 122 via video portal 114 (e.g., video portal 144) and questions from the user. Video playback analysis program 200 sends information to video playback analysis client program 146 (e.g., video playback analysis client program 116) to solicit online video responses 124 and/or searches within online video responses 124 (e.g., stored user comments) based on the query from video playback analysis client program 116 (video playback analysis client program 146). Video playback analysis program 200 sends online video responses 124 to the user of client device 110 (e.g., client device 140) via video playback analysis client program 116 (e.g., video playback analysis client program 146). In the depicted embodiment, video playback analysis program 200 resides on server 120. In another embodiment, video playback analysis program 200 resides on another server or computing device (not shown).

Figure 2:
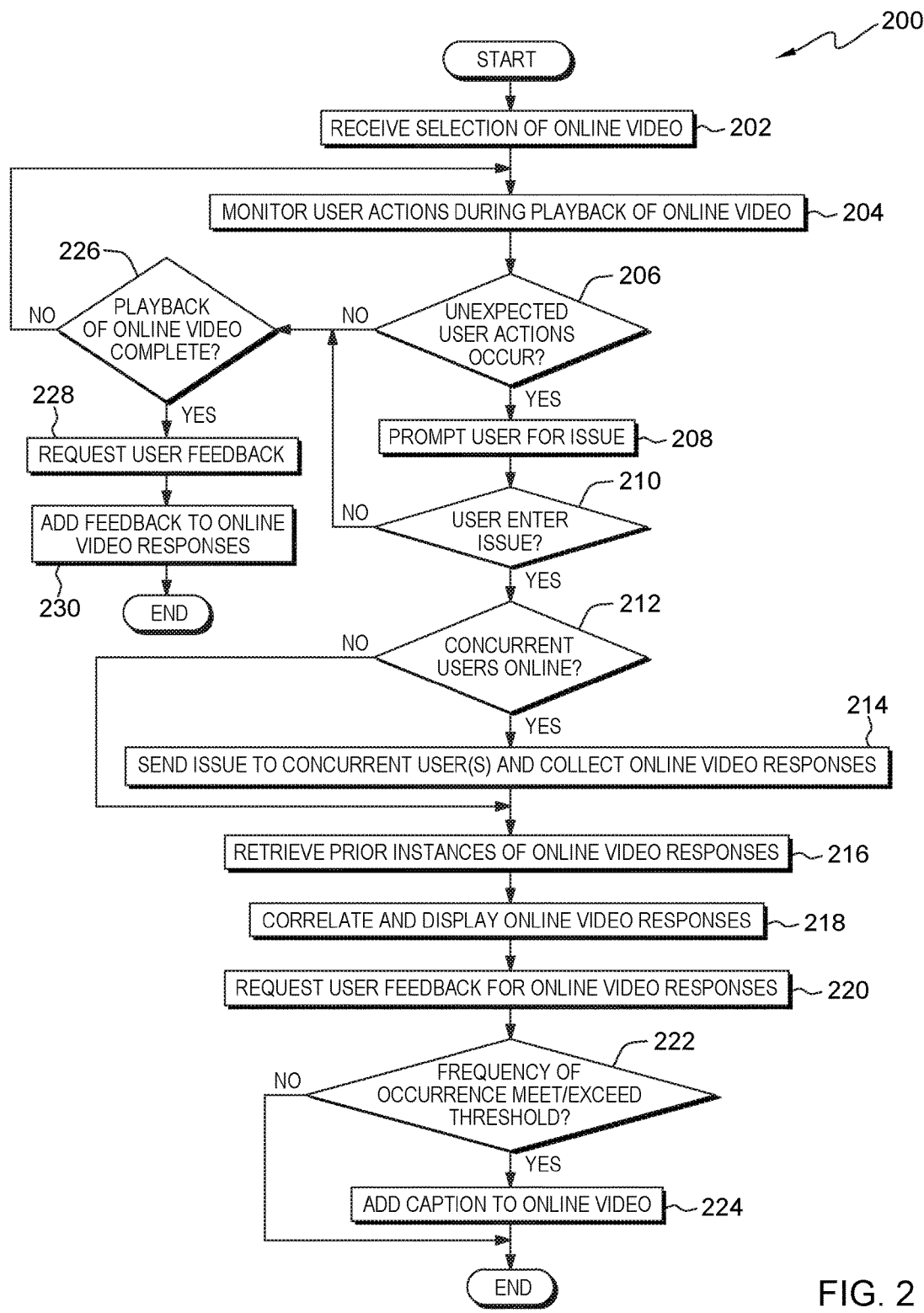
FIG. 2 is a flowchart depicting operational steps of a video playback analysis program, on a server computer within the distributed data processing environment of FIG. 1, for analyzing user actions associated with the playback of an online video and providing crowd sourced assistance, in accordance with an embodiment of the present invention.
Figure 3A:
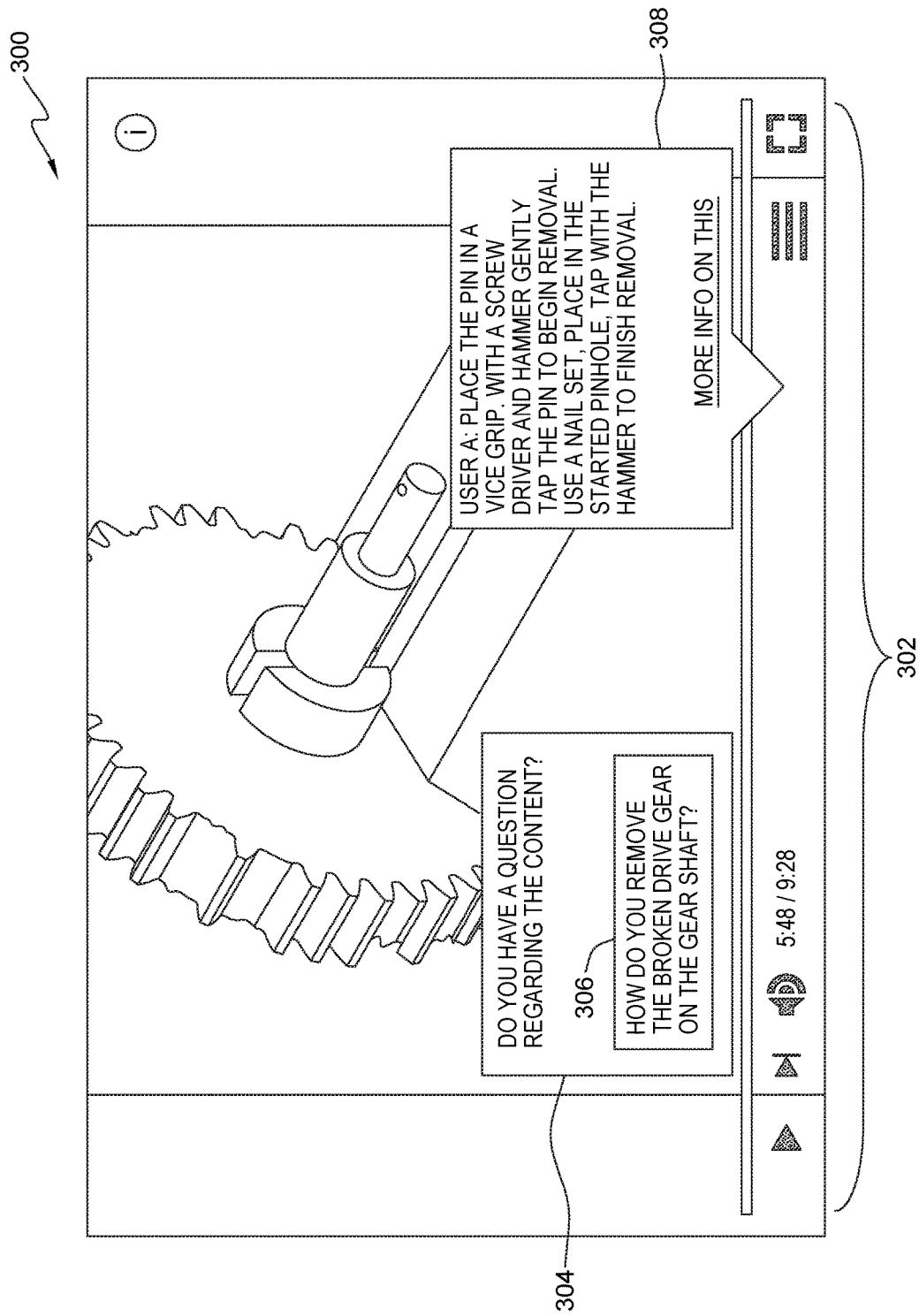
FIG. 3A is an example of an online video utilizing the video playback analysis program to acquire a user inquiry and provide a crowd sourced response, in accordance with an embodiment of the present invention.
Figure 3B:
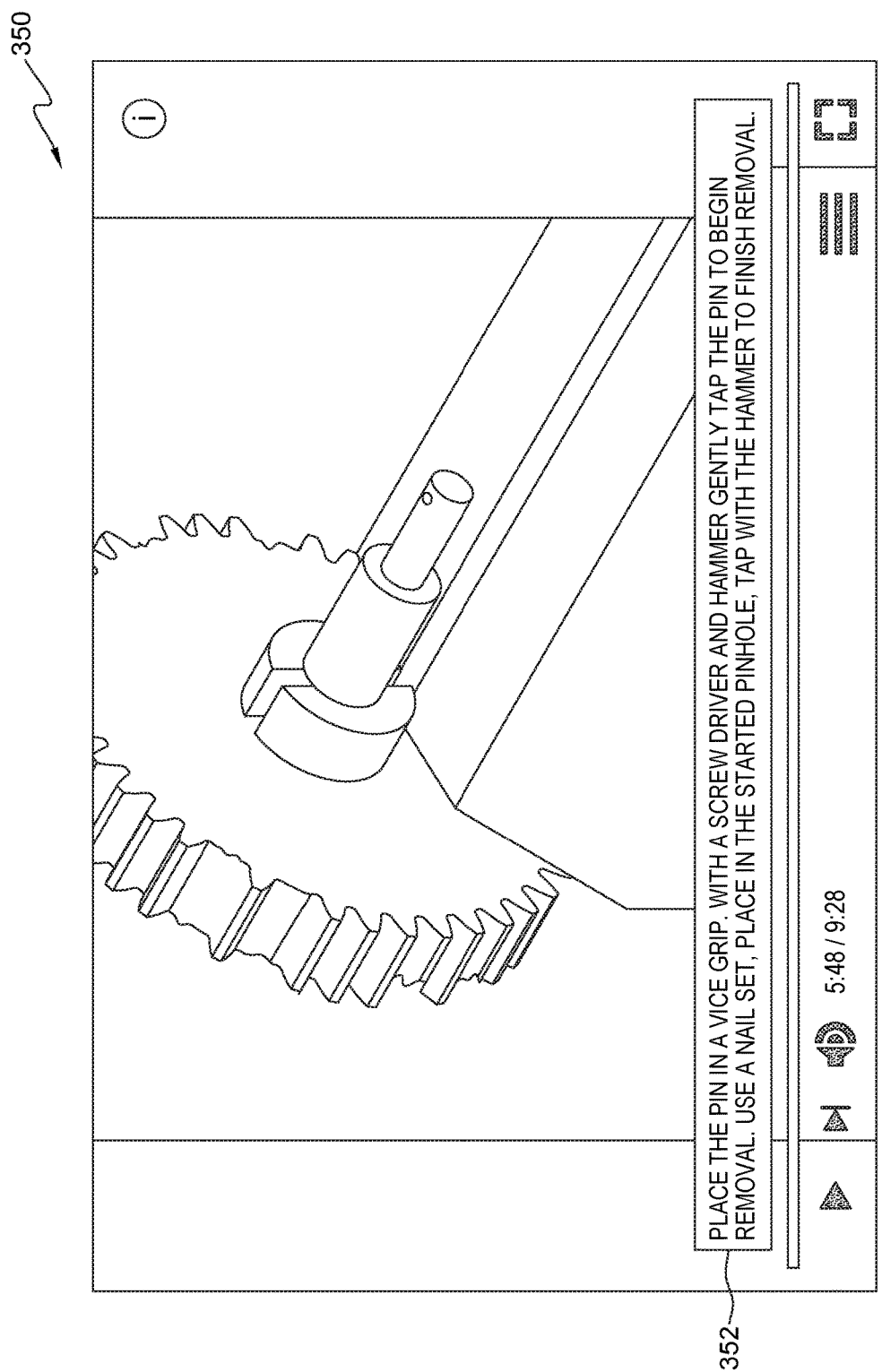
FIG. 3B is an example of the online video utilizing the video playback analysis program to integrate the crowd sourced response into the online video, in accordance with an embodiment of the present invention.

FIG. 2 is a flowchart depicting operational steps of video playback analysis program 200, a program for analyzing user actions associated with the playback of online video 122 and providing crowd sourced assistance (e.g., online video responses 124), in accordance with an embodiment of the present invention. Video playback analysis program 200 may operate in real-time. Video playback analysis program 200 operates with respect to multiple users, multiple issues, multiple instances of online video 122, etc., at the same time (e.g., concurrent usage, multi-tasking) and is not limited to a single user, online video 122, online video responses 124 and/or a single set of concurrent users.

In step 202, video playback analysis program 200 receives a selection of online video 122 and initiates. A user of client device 110, through video portal 114 and user interface 112, selects online video 122 (e.g., clicks via a mouse to watch online video 122) to view. Video playback analysis program 200 receives the selection of online video 122 from video playback analysis client program 116. In one embodiment, video playback analysis program 200 initiates automatically (i.e., online video 122 automatically plays upon selection). In another embodiment, video playback analysis program 200 initiates upon receipt of an indication from the user to play online video 122 via a function of video portal 114. For example the user double clicks online video 122 or selects the play icon within video portal 114, via user interface 112, which begins playing online video 122, and video playback analysis program 200 initiates.

In step 204, video playback analysis program 200 monitors user actions during playback of online video 122. Video portal 114 receives online video 122 from server 120 for viewing by the user of client device 110. Video playback analysis program 200 receives actions initiated by the user of client device 110 through user interface 112 with respect to video portal 114 from video playback analysis client program 116. Video playback analysis program 200 records a type of action (e.g., play, pause, rewind, fast forward, playback speed changes, etc.) that occurs, a number of times the action occurs, a start time of the action within online video 122, and/or a stop time of the action within online video 122 (e.g., records actions selected through video portal 114). In one embodiment, video playback analysis program 200 records a single play action to initiate the playback of online video 122 and a single stop action associated with the conclusion of online video 122 (i.e., user views online video 122 without interruption). In another embodiment, video playback analysis program 200 records multiple actions in a single session (e.g., play, fast forward, rewind, pause, stop, play back speed changes, repeat, etc.) and/or multiple viewing occurrences (e.g., repeated playback of portions of online video 122, repeated playback of online video 122 from start to finish, etc.). In one embodiment, video playback analysis program 200 determines the number of occurrences associated with online video 122 within a session. Video playback analysis program 200 tracks the number of occurrences based on identification information associated with online video 122.

For example, as depicted in example 3A, online video 300, the user, while viewing online video 300, returns to a time within online video 300 that corresponds to an elapsed time of five minutes and forty-eight seconds, as noted in video portal control and status bar 302. The user initiates playback of online video 300 at the five minutes and forty-eight seconds mark, but changes the rate of the playback by slowing down the playback speed. At seven minutes and twenty seconds, the user pauses online video 300 and returns to the time within online video 300 that corresponds to five minutes and forty-eight seconds. The user again slows down the playback of online video 300, and repeats the same sequence of actions an additional five times. Video playback analysis program 200 records a regular play action with one occurrence (e.g., initial viewing of online video 300) staring at zero minutes and zero seconds, a stop action with a stop time of nine minutes and twenty-eight seconds, six occurrences of a start time of five minutes and forty-eight seconds, six occurrences of an end time of seven minutes and twenty seconds, six occurrences of a playback with a reduced speed beginning at five minutes and forty-eight seconds, and six occurrences of a pause action at seven minutes and twenty seconds.

In one embodiment, video playback analysis program 200 resets the number of occurrences associated with online video 122 if video playback analysis program 200 determines the user switches to a new instance of online video 122 (i.e., only stores the number of occurrences for the current instance of online video 122). In another embodiment, video playback analysis program 200 stores the number of occurrences associated with each instance of online video 122 within a session. In some other embodiments, video playback analysis program 200 determines whether online video 122 has been previously viewed within the session. If video playback analysis program 200 determines the instance of online video 122 has been previously viewed, then video playback analysis program 200 resumes incrementing (e.g., counting) the number of occurrences associated with the previously viewed instance of online video 122. In yet another embodiment, video playback analysis program 200 resets the number of occurrences associate with an instance of online video 122 or multiple instances of online video 122 upon determining the user closes video portal 114 (e.g., exits, switches to a new website, ends the session, etc.).

In an alternate embodiment, video playback analysis program 200 monitors user actions during playback of online video 122 across multiple sessions. Video playback analysis program 200 determines whether online video 122 has been previously viewed within a prior session based on identification information associated with online video 122. Video playback analysis program searches within stored session data for the identification information associated with previous instances of online video 122. If video playback analysis program 200 determines the instance of online video 122 has been previously viewed in a prior session, the video playback analysis program 200 retrieves the number of occurrences from memory, and resumes counting the number of occurrences associated with the previously viewed instance of online video 122. For example, a user views online video 122 three times, but is unable to see an aspect of online video 122 clearly. While attempting to enlarge the viewing size of the window, the user accidentally closes video portal 114. The user reselects online video 122 for viewing and by utilizing the identification information, video playback analysis program 200 determines the current instance of online video 122 matches a prior instance of online video 122. Video playback analysis program 200 increments the number of occurrences to four rather than restarting at one.

Additionally, in some embodiments, video playback analysis program 200 determines whether multiple session correlation occurs with respect to online video 122 based upon determining whether a time frame is valid. The time frame defines a time period that is set as a default within video playback analysis program 200 and/or updated by the user (e.g., number of hours, days, a week, etc.) in which video playback analysis program correlated the information across multiple sessions or resets the values. Video playback analysis program 200 compares the most recent access time of the user associated with online video 122 with the time frame. If video playback analysis program 200 determines the time frame is within the time frame allowed (e.g., less than or equal to the time frame), then video playback analysis program 200 resumes counting (i.e., incrementing) the number of occurrences associated with online video 122. If video playback analysis program 200 determines the time frame is not allowed (e.g., exceeds the time frame), then video playback analysis program 200 resets the number of occurrences associated with online video 122 to zero and begins a new count for the number of occurrences.

In decision 206, video playback analysis program 200 determines whether unexpected user actions occur. An unexpected user action (e.g., uncommon action) refers to actions taken by a user that are not often found, seen, and/or experienced during the playback of online video 122. In one embodiment, video playback analysis program 200 determines unexpected user actions (e.g., uncommon actions) occur upon determining the user selects a function within video portal 114 that is not typically utilized during playback (e.g., slowing down of the playback speed, performing a key word search within prior online video responses 124, etc.). In another embodiment, video playback analysis program 200 determines unexpected user actions occur upon determining the number of occurrences of unexpected user actions meets and/or exceeds a threshold value (e.g., repeating pattern). For example, video playback analysis program determines a user that replays online video 122 three times does not meet and/or exceed the threshold, and therefore, determines unexpected user actions do not occur. However, video playback analysis program determines a user that replays online video 122 ten times exceeds the threshold, and therefore, determines unexpected user actions occur. In another embodiment, video playback analysis program 200 determines unexpected user actions occurs as a combination of the aforementioned embodiments.

If video playback analysis program 200 determines unexpected user actions occur. (decision 206, yes branch), then video playback analysis program 200 prompts the user for an issue (step 208). If video playback analysis program 200 determines unexpected user actions do not occur (decision 206, no branch), then video playback analysis program 200 determines whether the playback of online video 122 is complete (decision 226).

In step 208, video playback analysis program 200 prompts the user for an issue. In one embodiment, video playback analysis program 200 displays a pop-up window, with prompts requesting the user to enter a problem, an issue, language/translation issue, a question, etc. For example as depicted in example 3A, video playback analysis program 200 displays pop-up window 304 that includes the following prompt "Do you have a question regarding the content?" In some embodiments, video playback analysis program 200 displays a pop-up window that includes a submission button (e.g., submit, complete, enter, etc.) and a dismissal button (e.g., close, exit, no, etc.). In another embodiment, video playback analysis program 200 displays a pop-up window without submission buttons, and interprets the pressing of the enter key as a submission of an issue. In some other embodiment, video playback analysis program 200 displays a series of pop-up windows that the user navigates through (e.g., entry of information in each window results in video playback analysis program 200 opening an additional pop-up window). For example, video playback analysis program 200 displays a first pop-up window asking whether the user requires assistance. If video playback analysis program 200 determines the user enters yes, video playback analysis program 200 displays a second pop-up window requesting the user enter the issue.

In one alternate embodiment, video playback analysis program 200 receives an issue from the user prior to video playback analysis program 200 providing a prompt. Video playback analysis program 200 receives an indication from the user requesting assistance via video playback analysis client program 116. Video playback analysis program 200 initiates to display an interactive assistance and/or help functions (e.g., search function, help window, help topics, common issues, etc.) to the user via video playback analysis client program 116. For example, the user views online video 122, and after initially viewing online video 122, but does not understand the content of a portion of online video 122. Rather than viewing online video 122 repeatedly, the user via user interface 112 selects a help function to enter an issue. Video playback analysis program 200 initiates to display a pop-up window, via video playback analysis client program 116, with an active text response box that asks the user to please enter the issue. The user enters the issue and selects "ok" and/or presses "enter," via user interface 112. Video playback analysis program 200 receives the issue from video playback analysis client program 116 for further utilization.

In another alternate embodiment, video playback analysis program 200 automatically identifies an issue. Video playback analysis program 200 is set to automatic identification mode (e.g., pro-active) through a user selection and/or as a default. Video playback analysis program 200 identifies unexpected user actions occur (e.g., uncommon action). Video playback analysis program 200 searches prior stored viewing occurrences of online video 122 associated with an issue for similar unexpected user actions that are within a tolerance (e.g., time variance, shared viewing percentage, etc.) associated with the unexpected user actions for the current instance of online video 122. A time variance tolerance identifies an allowable (e.g., acceptable) time difference (i.e., a specified time that is plus and/or minus the start and/or stop time) associated with the start and/or stop time of the unexpected user actions, which video playback analysis program 200 utilizes to determine similarity. A shared viewing percentage tolerance identifies the minimum percentage (e.g., eighty percent, ninety percent, etc.) of online video 122 that is the same within the prior instance and the current instance of online video 122, which video playback analysis program 200 utilizes to determine similarity.

For example, within online video 300, the start time is five minutes and forty eight seconds and the stop time is seven minutes and twenty seconds. However, video playback analysis program 200 identifies a prior instance of online video 300 with an issue in memory, in which the start time is five minutes and fifty second and a stop time of seven minutes ten seconds. Video playback analysis program 200 determines the start and stop times are within tolerance (e.g., the delta between the two start times and the two stop times are less than 30 seconds). Video playback analysis program 200 also determines that the shared viewing percentage between the two instances of online video 122 is eighty-seven percent. Video playback analysis program 200 determines the viewed portions of online video 122 are similar based on one of more of the tolerances, and retrieves the issue associated with the prior instance of online video 122. In one embodiment, video playback analysis program 200 selects and displays the prior issue to the user for verification and/or changes by the user (decision 210), thereby allowing confirmation and/or refinement of the issue by the user. In another embodiment, if video playback automatically selects the issue, video playback analysis program 200 skips decision 210 and determines whether concurrent users are online (decision 212).

In decision 210, video playback analysis program 200 determines whether the user enters an issue. In one embodiment, video playback analysis program 200 receives a selection and/or text from the user, via user interface 112, through video playback analysis client program 116. In another embodiment, video playback analysis program 200 receives verification of a prior issue and/or updates to the text of the prior issue that video playback analysis program 200 provides in step 208. Video playback analysis program 200 interprets the received selection of "yes" and/or textual information and the enter command as submission of the issue. Video playback analysis program 200 stores the issue for further use. For example, as depicted in example 3A, the user enters text into submission box 306 with the question "How do you remove the broken drive gear on the gear shaft?" and presses enter. Video playback analysis program 200 receives the enter command and interprets the selection to be an affirmative response for assistance. Video playback analysis program 200 receives the textual information (e.g., text) with the enter command and stores the text associated with the user submission for further use. Conversely, video playback analysis program 200 interprets the closing of the pop-up window, selection of "no," or a lack of textual input to be a negative response for assistance, and does not store an issue.

If video playback analysis program 200 determines the user enters an issue (decision 210, yes branch), then video playback analysis program 200 determines whether concurrent users are online (decision 212). If video playback analysis program 200 determines the user does not enter an issue (decision 210, no branch), then video playback analysis program 200 determines whether the playback of online video 122 is complete (decision 226).

In decision 212, video playback analysis program 200 determines whether concurrent users are online. Concurrent users are additional online users that are either viewing online video 122 at the same time as the user, or have recently viewed online video 122. For example the user of client device 140 accesses video portal 144 and the same instance of online video 122 as the user of client device 110 and video portal 114. Therefore, video playback analysis program 200 determines the user of client device 140 is a concurrent user of the user of client device 110. Video playback analysis program 200 tracks users that are online (e.g., active at the website) through website visitor tracking and/or website analytics. As users access online video 122 via video portal 114 and/or video portal 144, video playback analysis program 200 stores user information (e.g., Internet Protocol (IP) addresses, cookies, login information, online status, etc.) to identify the users and the instances of online video 122 associated with each individual user within a viewing history (i.e., repository that stores a record of previous instances of online video 122 that each individual user views). Video playback analysis program 200 tracks the instances of online video 122 within the current session and/or previous session (i.e., identifies users online that viewed online video 122 at another time) in order to identify concurrent users. Video playback analysis program 200 identifies users that are online (e.g., currently accessing the website via video portals). Video playback analysis program 200 searches within the online users for users currently viewing online video 122 and/or online users that include online video 122 in the viewing history. Video playback analysis program 200 identifies the concurrent users based on the search results.

For example, Mary, Tom, Paul, and Sarah are online via video portals that are accessing the same website with multiple varying instances of online video 122 (e.g., not all users are watching the same instance of online video 122). Video playback analysis program 200 determines Mary accesses online video 122 and enters an issue. Video playback analysis program 200 searches within the remaining online users (Tom, Paul, and Sarah) for users that are currently viewing online video 122. Video playback analysis program 200 determines Tom is also currently viewing online video 122, and is therefore a concurrent user, but Paul and Sarah are not yet identified as concurrent users. However, video playback analysis program 200 additionally searches the viewing history associated with the remaining additional online users (Paul and Sarah) for instances of online video 122. Video playback analysis program 200 determines while not currently watching online video 122, Paul previously viewed online video 122, and is therefore also a concurrent user, but Sarah did not view online video 122 and is not a concurrent user. Therefore, video playback analysis program 200 determines of the three additional online users, Tom and Paul are concurrent users.

If video playback analysis program 200 determines concurrent users are online (decision 212, yes branch), then video playback analysis program 200 sends the issue to the concurrent users and collects online video responses 124 (step 214). If video playback analysis program 200 determines concurrent users are not online (decision 212, no branch), then video playback analysis program 200 retrieves available prior and/or alternate responses (step 216).

In step 214, video playback analysis program 200 sends the issue to the concurrent users and collects online video responses 124. In one embodiment, video playback analysis program 200 determines whether the concurrent users select to participate in providing online video responses 124. In one embodiment, video playback analysis program 200 determines concurrent users select to not participate in providing online video responses 124 (e.g., account setting, block pop-up windows, upon access select to not participate, etc.). If video playback analysis program 200 determines the user selects to participate, video playback analysis program 200 includes the users as a concurrent user. Conversely, if video playback analysis program 200 determines the user does not select to participate, then video playback analysis program 200 removes the user from the list of concurrent users. In another embodiment, video playback analysis program 200 determines concurrent users select to provide online video responses 124 to social network connections as identified within a social network account (e.g., friend list). If video playback analysis program 200 determines the user is a friend of the user with the issue, then video playback analysis program 200 includes the user as a concurrent user. Conversely, if video playback analysis program 200 determines the user is not a friend of the user with the issue, then video playback analysis program 200 removes the user from the list of concurrent users. Video playback analysis program 200 sends the issue to the identified concurrent users via a pop-up window, an alert, a message, etc., for display and input on client device 140 through video playback analysis client program 146.

In another embodiment, video playback analysis program 200 identifies a subset of concurrent users. Video playback analysis program 200 selects a set number of concurrent users based on a percentage of a total number of concurrent users, a maximum number of concurrent users, concurrent users within a geographic region, placement within online video 122 (i.e., at what point in viewing online video 122 the user is at), etc. Video playback analysis program 200 send the issue to the identified concurrent users via a pop-up window, an alert, a message, etc., for display and input on client device 140 through video playback analysis client program 146. For example, video playback analysis program 200 identifies one hundred users and selects twenty percent of the users to provide online video responses 124 (e.g., twenty concurrent users). In addition, video playback analysis program 200 identifies that ten of the one hundred users are located in the same geographic region (e.g., users share a common language, as identified by the settings of video portals 114 and 144, and video playback analysis program 200 avoids a language/translation issue). Of the ten users, video playback analysis program 200 determines seven of the users are nearing completion of online video 122 or are past the point within online video 122 associated with the issue, while the remaining three are starting online video 122 or are prior to the point within online video 122 associated with the issue. Video playback analysis program 200 selects the seven users in the same geographic region to be part of the subset of concurrent users, and then selects an additional thirteen users from the remaining concurrent users. Video playback analysis program 200 sends the request for online video responses 124 with the issue for display on client device 140 through video playback analysis client program 146.

Video playback analysis program 200 receives online video responses 124 from the concurrent users or subset of the concurrent users. Video playback analysis program 200 receives online video responses 124 from video playback analysis client program 146 after a user enters an instance of online video responses 124. In some embodiments, video playback analysis program 200 utilize a language translation service, and translates online video responses 124 into the language identified within the settings of video portal 114 for the user (e.g., language of video portal 114 is set to Spanish but online video responses 124 are received in English). Video playback analysis program 200 stores online video responses 124 in the original language and/or the translation for further use. In one embodiment, video playback analysis program 200 additionally determines whether video playback analysis program 200 receives a minimum number of instances of online video responses 124. Video playback analysis program 200 determines the minimum number of instances of online video responses 124 to be a set number and/or a set percentage of the total number of concurrent users that receive the issue. Video playback analysis program 200 utilizes statistical trends and probabilities in order to predict the number of users that are likely to enter an instance of online video responses 124. For example, video playback analysis program 200 sends the issue to twenty concurrent users. The probability of receiving a response is eighty percent; therefore, the minimum number of instances of online video responses 124 that video playback analysis program 200 anticipates to receive is sixteen.

If video playback analysis program 200 determines the minimum number of instances of online video responses 124 are not received, then video playback analysis program 200 determines whether additional concurrent users are online that have not been previously contacted. Video playback analysis program 200 sends the issue to the additional concurrent users. If video playback analysis program 200 determines that no additional concurrent users are online that have not been contacted previously, then video playback analysis program 200 retrieves prior instances of online video responses 124 (step 216). In some embodiments, video playback analysis program 200 sets a time limit that video playback analysis program 200 waits to receive online video responses 124 and/or sets a minimum number of attempts to receive the minimum number of online video responses 124 prior to proceeding, in order to limit an elapsed time prior to providing an answer from online video responses 124 to the user for the issue.

In step 216, video playback analysis program 200 retrieves prior instances of online video responses 124. In one embodiment, video playback analysis program 200 retrieves online video responses 124 associated with online video 122 from memory (i.e., stored prior online video responses 124, user comments, user reviews, etc.). In another embodiment, video playback analysis program 200 extracts keywords from the issue to identify related instances of online video responses 124. Video playback analysis program 200 removes common words from the issue utilizing a dictionary that includes commonly used words. Video playback analysis program 200 stores the remaining non-common words as the keywords. Video playback analysis program 200 searches online video responses 124 for the identified keywords and identifies matches. Video playback analysis program 200 retrieves the matching instances of online video responses 124.

In another embodiment, video playback analysis program 200 utilizes natural language processing and/or content analysis with respect to the keywords and/or the issue, to identify additional related prior instances of online video responses 124 from memory. For example, an instance of online video responses 124 does not include identified keywords; however, video playback analysis program 200 identifies synonyms that are included within additional prior instances of online video responses 124. In another example, video playback analysis program 200 determines the overall meaning of the keywords as presented within the issue, and identifies additional prior instances of online video responses 124 (i.e., identifies issues that are not identical, but the topic is related based on similar content and/or concepts). Video playback analysis program 200 retrieves the additional related prior instances of online video responses 124 from memory. In some embodiments, video playback analysis program 200 does not identify previous instances of online video responses 124 (e.g., no prior entries are stored), and video playback analysis program 200 continues.

In another embodiment, video playback analysis program 200 receives online video responses 124 and/or additional online video responses 124 via Internet searches with respect to the issue. Video playback analysis program 200 performs a search of the Internet via a search engine utilizing the issue from decision 210 as the criteria for the search. Video playback analysis program 200 includes additional videos, websites, literature, etc., from the Internet search within online video responses 124. In addition, video playback analysis program 200 searches within the website that provides online video 122 for similar online videos (e.g., videos include related content, titles indicated relatedness, descriptions share keywords and topics, videos that are noted as watched by other uses that watched the current instance of online video 122, etc.). For example, video playback analysis program 200 does not receive and/or identify the minimum number of instances of online video responses 124. Video playback analysis program 200 searches the Internet and/or within the website for similar online videos, additional reference information, websites, literature, etc., to augment online video responses 124.

In step 218, video playback analysis program 200 correlates and displays online video responses 124. In one embodiment, video playback analysis program 200 analyzes the content of real-time instances of online video responses 124 and/or stored prior instances of online video responses 124 with respect to answering the identified issue. Video playback analysis program 200 calculates a probability for each instance of online video responses 124 that predicts the likelihood the instance of online video responses 124 provides the answer to the identified issue. In one embodiment, video playback analysis program calculates a probability based on the number of keywords and/or synonyms of the keywords from the issue that occur within online video responses 124. For example, the keywords from the issue are "remove," "broken," "drive gear", and "gear shaft." A first instance of online video responses 124 includes the four keywords and synonyms, while a second instance of online video responses 124 includes only the keyword "remove". Therefore, video playback analysis program 200 calculates a higher probability for the first instance of online video responses 124 than the second instance of online video responses 124. In another embodiment, video playback analysis program 200 calculates a probability based on content analysis (i.e., contextualized interpretations of documents). Video playback analysis program 200 utilizes the keywords of the issue and locates the important structures within online responses 124 and provides a meaningful reading of the content of online responses 124 (i.e., determines the relevance of the information provided by the text). In some other embodiment, video playback analysis program 200 calculates a probability based on the ratings (e.g., user review ratings, Internet search ratings, etc.) associated with individual instances of online video responses 124. For example, video playback analysis program 200 identifies three instances of online video responses 124 based on the identified issue. The first instance of online video response 124 includes a user review rating of five stars (e.g., highest rating, recommended), the second instance of online video response 124 includes a user review rating of two stars (e.g., low rating, minimal assistance, limited use), and the third instance of online video responses 124 includes a user review rating of three stars (e.g., moderate rating, average, not recommended, etc.). Online video response program 200 calculates the probability of the first instance on online video response 124 to be the highest, and the second instance of online video response 124 as the lowest. In yet some other embodiment, online video playback analysis program 200 utilizes a combination of the aforementioned embodiments to calculate a probability for each instance of online video responses 124.

Video playback analysis program 200 ranks online video responses 124 based on the probability (e.g., most likely to least likely, highest probability to lowest probability, etc.). In one embodiment, video playback analysis program 200 selects the instance of online video responses 124 with the highest probability for display. Video playback analysis program 200 sends an initiation request through video playback analysis client program 116 to user interface 112 to initiate the display of at least the selected instance of online video responses 124 to the user. In another embodiment, video playback analysis program 200 initiates to display multiple instances of online video responses 124 and/or provides an option to view additional instances of online video responses 124. For example as depicted in example 3A, video playback analysis program 200 displays online video response 308 from "User A" which states "User A: Place the pin in a vice gripe. With a screw driver and hammer gently tap the pin to begin removal. Use a nail set, place in the started pinhole, tap with the hammer to finish removal."

In another embodiment, video playback analysis program 200 ranks or adjusts the ranking of online video responses 124 based on prior ratings. Video playback analysis program 200 retrieves ratings associated with prior instances of online video responses 124. For example, another user previously utilized an instance of online video responses 124 and rated the usefulness of the content. In one embodiment, video playback analysis program 200 ranks online video responses 124 by the rating (e.g., highest rated to lowest rated). In another embodiment, video playback analysis program 200 recalculates the probability of online video responses 124, by including a rating factor in the calculation, which raises or lowers the probability value. The rating factor reflects the perceived usefulness of the instance of online video responses 124 by prior users. Video playback analysis program 200 reorganizes the ranking of online video responses 124 based on the recalculated probabilities. In one embodiment, video playback analysis program 200 initiates to display the highest ranked instance of online video responses 124 to the user via user interface 112. In another embodiment, video playback analysis program 200 displays multiple instances of online video responses 124 and/or an option to view additional instances of online video responses 124 to the user via user interface 112.

In step 220, video playback analysis program 200 requests user feedback for online video responses 124. Video playback analysis program 200 identifies and stores an indication of the instance of online video responses 124 displayed to the user. Video playback analysis program 200 sends an initiation request through video playback analysis client program 116 to user interface 112 to initiate the display of a request for user feedback (e.g., pop-up window request). Video playback analysis program 200 requests the user rate and/or provide text feedback (e.g., reviews, additional information, etc.) related to the quality and usefulness of the viewed instance of online video responses 124. Video playback analysis program 200 determines whether the user enters a new rating. If video playback analysis program 200 determines that the user enters the new rating, then video playback analysis program 200 stores the new rating with the associated instance of online video responses 124. In addition, video playback analysis program 200 updates the prior rating of the instance of online video responses 124 with a new rating (i.e., raises or lowers the prior rating and creates the new rating by combining the new rating with the prior rating(s)). Video playback analysis program 200 annotates the associated online video response 124 with the additional feedback (e.g., text) information and/or adds a new instance of online video responses 124 for use in subsequent iterations. If video playback analysis program 200 determines the user does not enter a new rating, then video playback analysis program 200 retains the prior rating (i.e., does not change the prior rating) and continues.

In decision 222, video playback analysis program 200 determines whether the frequency of occurrence of the issue meets and/or exceed a threshold. Video playback analysis program 200 tracks the frequency of occurrences associated with the issue (e.g., automatic identification of an issue and/or user identification of an issue). In one embodiment, video playback analysis program 200 tracks the frequency of occurrences as the number of times video playback analysis program 200 determines the same issue is received and/or perceived to occur based on the content analysis of the issue. In another embodiment, video playback analysis program 200 tracks the frequency of occurrence based on the viewed instance of online video responses 124 associated with an issue. Video playback analysis program 200 increases the frequency of occurrence associated with the issue associated with the viewed instance of online video responses 124. Additionally in some embodiments, video playback analysis program 200 may tag the viewed instance of online video response 124 with the identified issue for future correlation. For example, video playback analysis program 200 provides the highest probability instance of online video responses 124. However, the user selects to view and/or provide a rating associated with a different instance of online video responses 124 associated with a different issue. Therefore, video playback analysis program 200 increments the frequency of occurrence of the issue associated with the selected instance of online video responses 124 instead of the frequency of occurrence of the issue associated with the highest probability.

Video playback analysis program 200 compares the frequency of occurrence associated with the issue with a threshold value. The threshold value assists in the identification of a recurring issue (e.g., common problem) encountered by users viewing online video 122 for video playback analysis program 200 to resolve in order to assist future users. In one embodiment, video playback analysis program 200 utilizes a predefined threshold (e.g., set number). In another embodiment, video playback analysis program 200 utilizes a calculated threshold based on a percentage of a total number of viewers and/or a time period over which video playback analysis program 200 receives the issue (e.g., elapsed time between receipt of the same issue). For example, a threshold is set at five percent of the total number of users that view online video 122. Video playback analysis program 200 identifies one million users viewed online video 122, and of the one million views, one percent of the users identified an issue. Therefore, video playback analysis program 200 determines the threshold is not met and/or exceeded. However in another example, over a one week period, video playback analysis program 200 identifies one hundred users viewed online video 122, and fifteen viewers (fifteen percent) identify the same issue. Therefore, video playback analysis program 200 determines that the threshold is met and/or exceeded. In another embodiment, video playback analysis program 200 utilizes a combination of one or more of the aforementioned embodiments.

If video playback analysis program 200 determines the frequency of occurrence meets and/or exceeds the threshold (decision 222, yes branch), then video playback analysis program 200 adds a caption to online video 122 (step 224). If video playback analysis program 200 determines the frequency of occurrence does not meet and/or exceed the threshold (decision 222, no branch), then video playback analysis program 200 completes (i.e., ends).

In step 224, video playback analysis program 200 adds a caption to online video 122. Video playback analysis program 200 selects the highest rated instance of online video responses 124. In some embodiments, video playback analysis program 200 adds, translates, and/or paraphrases a prior caption or a new caption (i.e., utilizes the local dialect, slang, jargon, word preferences, etc.), if video playback analysis program 200 determines the issue is related to a language/translation issue. Video playback analysis program 200 may edit online video 122. Video playback analysis program 200 identifies the portion of online video 122 associated with the issue and inserts the caption into online video 122. In one embodiment, video playback analysis program 200 inserts the caption for the time period associated with the issue. In another embodiment, video playback analysis program 200 inserts the caption for set time period (e.g., 30 seconds, one minute, etc.) and removes or hides the caption after the set time period expires. As depicted in example 3B, updated online video 350, at five minutes and forty-eight seconds video playback analysis program 200 inserts caption box 352 that states "Place the pin in a vice gripe. With a screw driver and hammer gently tap the pin to begin removal. Use a nail set, place in the started pinhole, tap with the hammer to finish removal." Video playback analysis program 200 stores the updated version of online video 122 (e.g., updated online video 350) for future viewing. For example, the next user that views online video 122 (e.g., online video 300) receives the updated instance of online video 122 (e.g., updated online video 350) instead, which includes the caption. Video playback analysis program 200 completes after adding the caption and storing the updated instance of online video 122.

In decision 226, video playback analysis program 200 determines whether the playback of online video 122 is complete. As a user views online video 122, video playback analysis program 200 provides ongoing monitoring of user actions during the playback of online video 122 (step 204) and determines whether unexpected user actions occur (decision 206). Video playback analysis program 200 monitors the playback position within online video 122. In one embodiment, video playback analysis program 200 compares the position (e.g., time) within the playback of online video 122 with the total playing time of online video 122. If video playback analysis program 200 determines the position (e.g., time) within the playback of online video 122 is equal to the total playing time (e.g., length of online video 122), then video playback analysis program 200 determines playback of online video 122 is complete. If video playback analysis program 200 determines the position (e.g., time) within the playback of online video 122 is not equal to the total playing time (e.g., length of online video 122), then video playback analysis program 200 determines playback of online video 122 is not complete.

In addition, in some embodiments, video playback analysis program 200 utilizes a time delay (i.e., a predefined countdown time that elapses prior to determining completion status) prior to video playback analysis program 200 determining whether the playback of online video 122 is complete. Utilization of the time delay by video playback analysis program 200 allows the user to select additional functions within video portal 114 (e.g., rewind, replay, etc.) prior to entering feedback. While video playback analysis program 200 determines time delay is valid (e.g., countdown is not equal to zero), video playback analysis program 200 monitors the functions of video portal 114 with respect to online video 122 for additional user actions to determine whether the playback of online video 122 is complete. If video playback analysis program 200 determines the user selects another function (e.g., play, replay, rewind, etc.) while the time delay is valid, then video playback analysis program 200 determines the playback of online video 122 is not complete. If video playback analysis program 200 determines the user does not select another function while the time delay is valid or the time delay is no longer valid (e.g., time delay expires, countdown is equal to zero), then video playback analysis program 200 determines the playback of online video 122 is complete.

If video playback analysis program 200 determines the playback of online video 122 is complete (decision 226, yes branch), then video playback analysis program 200 requests user feedback (step 228). If video playback analysis program 200 determines the playback of online video 122 is not complete (decision 226, no branch) then video playback analysis program 200 monitors user actions during playback of online video 122 (step 204).

In step 228, video playback analysis program 200 requests user feedback. Video playback analysis program 200 identifies the instance of online video 122 viewed by the user. Video playback analysis program 200 sends an initiation request through video playback analysis client program 116 to user interface 112 to initiate the display of a request for user feedback (e.g., pop-up window request, alert, message, etc.). Video playback analysis program 200 requests the user rate and/or provide text feedback (e.g., reviews, additional information, etc.) related to the quality and usefulness of online video 122. For example, video playback analysis program 200 initiates the display of a pop-up window that requests the user enter a rating and/or text feedback and/or asks whether the user will enter feedback.

In step 230, video playback analysis program 200 adds the feedback to online video responses 124. Video playback analysis program 200 determines whether the user enters a rating and/or text information. If video playback analysis program 200 determines that the user enters a rating and/or text information, then video playback analysis program 200 creates a new instance of online video responses 124 and stores the new rating and/or text. Video playback analysis program 200 adds the new instance of online video responses 124 to prior instances of online video responses 124 with the additional rating and/or text feedback for use in subsequent iterations. In addition, video playback analysis program 200 updates the prior rating of online video 122 with the new rating (i.e., raises or lowers the prior rating and creates the new rating by combining the new rating with the prior rating(s)). If video playback analysis program 200 determines the user does not enter a rating and/or text information, then video playback analysis program 200 completes without incorporating a change to online video responses 124.

Figure 4:
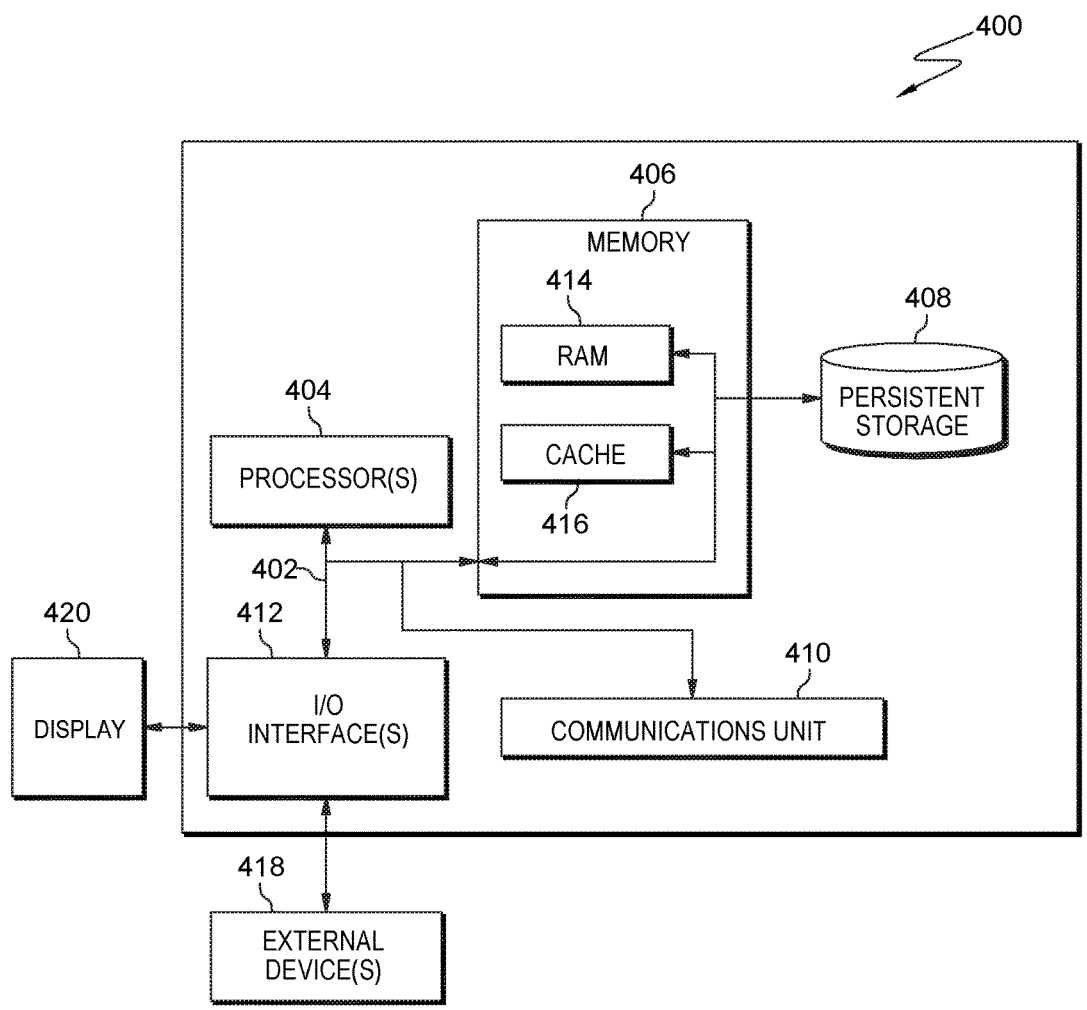
FIG. 4 is a block diagram of components of the server computer executing the video playback analysis program, in accordance with an embodiment of the present invention.

FIG. 4 depicts a block diagram of components of server computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM) 414. In general, memory 406 can include any suitable volatile or non-volatile computer readable storage media. Cache 416 is a fast memory that enhances the performance of computer processor(s) 404 by holding recently accessed data, and data near accessed data, from memory 406.

User interface 112, video portal 114, video playback analysis client program 116, user interface 142, video portal 144, video playback analysis client program 146, online video 122, online video responses 124, and video playback analysis program 200 may be stored in persistent storage 408 and in memory 406 for execution and/or access by one or more of the respective computer processor(s) 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. User interface 112, video portal 114, video playback analysis client program 116, user interface 142, video portal 144, video playback analysis client program 146, online video 122, online video responses 124, and video playback analysis program 200 may be downloaded to persistent storage 408 through communications unit 410.

I/O interface(s) 412 allows for input and output of data with other devices that may be connected to server computer 400. For example, I/O interface(s) 412 may provide a connection to external device(s) 418, such as a keyboard, a keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., user interface 112, video portal 114, video playback analysis client program 116, user interface 142, video portal 144, video playback analysis client program 146, online video 122, online video responses 124, and video playback analysis program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing assistance to a user viewing an online video, the method comprising:

receiving, by one or more computer processors, an online video;

determining, by one or more computer processors, that an uncommon action occurs with an associated start and stop time within the received online video;

identifying, by one or more computer processors, prior stored viewing occurrences of the received online by another users that include stored issues, wherein the stored issues occurs within a tolerance of the identified start and stop time;

automatically determining, by one or more computer processors, an issue that the user experiences based on the stored issues within the identified prior stored viewing occurrences, wherein the issue hinders the ability of the user to understand the content of the received online video;

providing, by one or more computer processors, the automatically determined issue to the user;

receiving, by one or more computer processors, an update to the automatically determined issue;

sending, by one or more computer processors, the updated issue to one or more concurrent users wherein the concurrent users include users that are currently online and viewing the received online video and users that are currently online and previously viewed the received online video;

receiving, by one or more computer processors, one or more responses associated with the updated issue from the one or more concurrent users, wherein the one or more responses are received in real-time and provide an answer to the updated issue;

identifying, by one or more computer processors, an at least one response from the received one or more responses associated with the updated issue based on locating keywords of the updated issue within structures of the received one or more responses that determine relevance; and providing, by one or more computer processors, the identified at least one response.

2. The method of claim 1, further comprising:

receiving, by one or more computer processors, a submission of the automatically determined issue;

performing, by one or more computer processors, a content analysis of the automatically determined issue and stored issues from the another users, wherein the content analysis identifies one or more similar issues within the stored issues from the another users;

calculating, by one or more computer processors, a frequency of occurrence associated with the automatically determined issue, based on the performed content analysis;

determining, by one or more computer processors, whether the frequency of occurrence associated with the automatically determined issue at least meets a threshold, wherein the threshold is a percentage of a total number of users for a time period that encounter the automatically determined issue and the identified one or more similar issues;

responsive to determining that the frequency of occurrence associated with the automatically determined issue at least meets the threshold, inserting, by one or more computer processors, a new caption into the received online video for a portion of the received online video associated with the determined issue, wherein the caption is based on the identified at least one response that provides the answer from the another users;

updating, by one or more computer processors, the received online video with the inserted new caption; and storing, by one or more computer processor, the updated online video that includes the inserted new caption as the received online video.

3. The method of claim 1, wherein determining that the uncommon action occurs further comprises:

monitoring, by one or more computer processors, individual instances of user actions with respect to the received online video for a repeating pattern, wherein the user actions includes a change to a rate of playback and a keyword search;

incrementing, by one or more computer processors, a frequency of occurrence associated with the individual instances of user actions;

determining, by one or more computer processors, whether the frequency of occurrence associated with the individual instances of user actions at least meets a threshold; and responsive to determining that the frequency of occurrence associated with the individual instance of the user actions at least meets the threshold, identifying, by one or more computer processors, the individual instance of user actions as an uncommon action.

4. The method of claim 1, wherein receiving one or more responses associated with the updated issue further comprises:

sending, by one or more computer processors, a request for a response to the one or more concurrent users, wherein the request for the response includes the updated issue;

receiving, by one or more computer processors, one or more responses from the identified one or more concurrent users; and storing, by one or more computer processors, the received one or more responses.

5. The method of claim 4, further comprising:

extracting, by one or more computer processors, one or more keywords for the determined issue;

identifying, by one or more computer processors, one or more responses associated with the received online video from memory based on natural language processing and content analysis of the one or more keywords within the determined issue;

retrieving, by one or more computer processors, one or more responses from memory that include the determined issue; and adding, by one or more computer processors, the retrieved one or more responses from memory to the received one or more responses.

6. The method of claim 4, further comprising:

performing, by one or more computer processors, an Internet search based on the updated issue; and adding, by one or more computer processors, the Internet search results to the received one or more responses, wherein the Internet search results include one or more of: online videos with related content, related titles, and a description that includes the extracted one or more keywords.

7. The method of claim 1, wherein identifying the at least one response from the received one or more responses associated with the updated issue further comprises:

analyzing, by one or more computer processors, the received one or more online responses with respect to answering the updated issue;

calculating, by one or more computer processors, a probability for each instance of the analyzed one or more online responses based on the extracted one or more keywords and an associated user review rating of the each instance of the analyzed one or more online responses, wherein the probability for each instance of the analyzed one or more online responses predicts a likelihood that the each instance of the analyzed one or more online responses provides an answer to the updated issue, wherein the associated user review rating is a rating factor that indicates a usefulness of each instance of the analyzed one or more online responses as perceived by one or more prior users;

ranking, by one or more computer processors, the one or more online responses based on the calculated probability, wherein the ranking is based from a highest probability to a lowest probability; and selecting, by one or more computer processors, at least the highest probability from the ranked one or more online responses as the at least one response.

8. The method of claim 1, wherein determining the one or more concurrent users that are currently active at a website that includes the online video further comprises:

determining by one or more computer processors, the one or more users based on an online user that is viewing the received online video at the same time as the user and an online user that previously viewed the received online video;

determining, by one or more computer processors, a subset of the determined one or more users based on a percentage of a total number of the determined one or more users, a maximum number of the determined one or more users, a geographic region associated with the determined one or more users that is a same geographic location of the user, and viewing placement within the received online video associated with the determined one or more users is after the determined issue; and selecting, by one or more computer processors, the determined subset as the one or more concurrent users.

9. A computer program product for providing assistance to a user viewing an online video, the computer program product comprising:

one or more computer readable storage medium and program instructions stored on the one or more computer readable storage medium, the program instructions comprising:

program instructions to receive an online video;

program instructions to determine that an uncommon action occurs with an associated start and stop time within the received online video;

program instructions to identify prior stored viewing occurrences of the received online by another users that include stored issues, wherein the stored issues occurs within a tolerance of the identified start and stop time;

program instructions to automatically determine an issue that the user experiences based on the stored issues within the identified prior stored viewing occurrences, wherein the issue hinders the ability of the user to understand the content of the received online video;

program instructions to provide the automatically determined issue to the user:

program instructions to receive an update to the automatically determined issue:

program instructions to send the updated issue to one or more concurrent users wherein the concurrent users include users that are currently online and viewing the received online video and users that are currently online and previously viewed the received online video;

program instructions to receive one or more responses associated with the updated issue from the one or more concurrent users, wherein the one or more responses are received in real-time and provide an answer to the updated issue;

program instructions to identify an at least one response from the received one or more responses associated with the updated issue based on locating keywords of the updated issue within structures of the received one or more responses that determine relevance; and program instructions to provide the identified at least one response.

10. The computer program product of claim 9, further comprising program instructions, stored on the one or more computer readable storage medium, to;

receive a submission of the automatically determined issue;

perform a content analysis of the automatically determined issue and stored issues from the another users, wherein the content analysis identifies one or more similar issues within the stored issues from the another users;

calculate a frequency of occurrence associated with the automatically determined issue, based on the performed content analysis;

determine whether the frequency of occurrence associated with the automatically determined issue at least meets a threshold;

responsive to determining that the frequency of occurrence associated with the determined issue at least meets the threshold, insert a new caption into the received online video for a portion of the received online video associated with the determined issue, wherein the caption is based on the identified at least one response that provides the answer from the another users;

updating, by one or more computer processors, the received online video with the inserted new caption; and storing, by one or more computer processor, the updated online video that includes the inserted new caption as the received online video.

11. The computer program product of claim 9, wherein to determine that the uncommon action occurs further comprises program instructions, stored on the one or more computer readable storage medium, to:

monitor individual instances of user actions with respect to the received online video for a repeating pattern, wherein the user actions includes a change to a rate of playback and a keyword search;

increment a frequency of occurrence associated with the individual instances of user actions;

determine whether the frequency of occurrence associated with the individual instances of user actions at least meets a threshold; and responsive to determining that the frequency of occurrence associated with the individual instance of the user actions at least meets the threshold, identify the individual instance of user actions as an uncommon action.

12. The computer program product of claim 9, wherein to receive one or more responses associated with the updated issue further comprises program instructions, stored on the one or more computer readable storage medium, to:

send a request for a response to one or more concurrent users, wherein the request for the response includes the updated issue;

receive one or more responses from the identified one or more concurrent users; and store the received one or more responses.

13. The computer program product of claim 12, further comprising program instructions, stored on the one or more computer readable storage medium, to:

extract one or more keywords for the determined issue;

identify one or more responses associated with the received online video from memory based on natural language processing and content analysis of the one or more keywords within the determined issue;

retrieve one or more responses from memory that include the determined issue; and add the retrieved one or more responses from memory to the received one or more responses.

14. The computer program product of claim 12, further comprising program instructions, stored on the one or more computer readable storage medium, to:

perform an Internet search based on the updated issue; and add the Internet search results to the received one or more responses, wherein the Internet search results include one or more of: online videos with related content, related titles, and a description that includes the extracted one or more keywords.

15. The computer program product of claim 9, wherein to identify the at least one response from the received one or more responses associated with the updated issue further comprises program instructions, stored on the one or more computer readable storage medium, to:

analyze the received one or more online responses with respect to answering the updated issue;

calculate a probability for each instance of the analyzed one or more online responses based on the extracted one or more keywords and an associated user review rating of the each instance of the analyzed one or more online responses, wherein the probability for each instance of the analyzed one or more online responses predicts a likelihood that the each instance of the analyzed one or more online responses provides an answer to the updated issue, wherein the associated user review rating is a rating factor that indicates a usefulness of each instance of the analyzed one or more online responses as perceived by one or more prior users;

rank the one or more online responses based on the calculated probability, wherein the ranking is based from a highest probability to a lowest probability; and select at least the highest probability from the ranked one or more online responses as the at least one response.

16. A computer system for providing assistance to a user viewing an online video, the computer system comprising:

one or more computer processors, one or more computer readable storage media, and program instructions stored on the computer readable storage media for execution by at least one of the one or more processors, the program instructions comprising:

program instructions to receive an online video;

program instructions to determine that an uncommon action occurs with an associated start and stop time within the received online video;

program instructions to identify prior stored viewing occurrences of the received online by another users that include stored issues, wherein the stored issues occurs within a tolerance of the identified start and stop time;

program instructions to automatically determine an issue that the user experiences based on the stored issues within the identified prior stored viewing occurrences, wherein the issue hinders the ability of the user to understand the content of the received online video;

program instructions to provide the automatically determined issue to the user;

program instructions to receive an update to the automatically determined issue;

program instructions to send the updated issue to one or more concurrent users wherein the concurrent users include users that are currently online and viewing the received online video and users that are currently online and previously viewed the received online video;

program instructions to receive one or more responses associated with the updated issue from the one or more concurrent users, wherein the one or more responses are received in real-time and provide an answer to the updated issue;

program instructions to identify an at least one response from the received one or more responses associated with the updated issue based on locating keywords of the updated issue within structures of the received one or more responses that determine relevance; and program instructions to provide the identified at least one response.

17. The computer system of claim 16, further comprising program instructions, stored on the one or more computer readable storage media, to;

receive a submission of the automatically determined issue;

perform a content analysis of the automatically determined issue and stored issues from the another users, wherein the content analysis identifies one or more similar issues within the stored issues from the another users;

calculate a frequency of occurrence associated with the automatically determined issue, based on the performed content analysis;

determine whether the frequency of occurrence associated with the automatically determined issue at least meets a threshold; responsive to determining that the frequency of occurrence associated with the determined issue at least meets the threshold, insert a new caption into the received online video for a portion of the received online video associated with the determined issue, wherein the caption is based on the identified at least one response that provides the answer from the another users;

updating, by one or more computer processors, the received online video with the inserted new caption; and storing, by one or more computer processor, the updated online video that includes the inserted new caption as the received online video.

18. The computer system of claim 16, wherein to determine that the uncommon action occurs further comprises program instructions, stored on the one or more computer readable storage media, to:

monitor individual instances of user actions with respect to the received online video for a repeating pattern, wherein the user actions includes a change to a rate of playback and a keyword search;

increment a frequency of occurrence associated with the individual instances of user actions;

determine whether the frequency of occurrence associated with the individual instances of user actions at least meets a threshold; and responsive to determining that the frequency of occurrence associated with the individual instance of the user actions at least meets the threshold, identify the individual instance of user actions as an uncommon action.

19. The computer system of claim 16, wherein to receive one or more responses associated with the updated issue further comprises program instructions, stored on the one or more computer readable storage media, to:

send a request for a response to the identified one or more concurrent users, wherein the request for the response includes the updated issue;

receive one or more responses from the identified one or more concurrent users; and store the received one or more responses.

* * * * *